United States Patent [19]
Dahlquist
[11] 3,889,102
[45] June 10, 1975

[54] OFF-AXIS CIRCULAR COORDINATE OPTICAL SCANNING DEVICE AND CODE RECOGNITION SYSTEM USING SAME

[75] Inventor: John C. Dahlquist, Roseville, Minn.
[73] Assignee: Minnesota Mining and Manufacturing Company, Saint Paul, Minn.

[22] Filed: Nov. 2, 1973
[21] Appl. No.: 412,174

[52] U.S. Cl. ..... 235/61.7 R; 235/61.11 E; 250/236; 250/568
[51] Int. Cl. ..... G06k 7/10
[58] Field of Search . 235/61.7 R, 61.11 E, 61.12 N; 250/236, 568, 569, 570, 216, 567, 566

[56] References Cited
UNITED STATES PATENTS

| | | | |
|---|---|---|---|
| 2,952,181 | 9/1960 | Maurer, Jr. | 250/236 |
| 3,239,674 | 3/1966 | Aroyan | 235/61.11 E |
| 3,600,556 | 8/1971 | Acker | 250/566 |
| 3,663,800 | 5/1972 | Myer | 235/61.11 E |
| 3,676,645 | 7/1972 | Fickenscher | 235/61.11 E |
| 3,728,677 | 4/1973 | Munson | 235/61.11 E |
| 3,743,820 | 7/1973 | Willits et al. | 235/61.11 E |

*Primary Examiner*—Stanley M. Urynowicz, Jr.
*Attorney, Agent, or Firm*—Alexander, Sell, Steldt & DeLaHunt

[57] ABSTRACT

A code recognition system in which an array of parallel reflecting marker strips are optically scanned within an interrogation zone in a circular coordinate scanning pattern. An optical scanning device includes a line scanning member for producing a planar scan and an angular scanning member for receiving the planar scan off its axis of rotation to process the planar scan about the axis, thereby expanding the effective scanned zone.

16 Claims, 7 Drawing Figures

OFF-AXIS CIRCULAR COORDINATE OPTICAL SCANNING DEVICE AND CODE RECOGNITION SYSTEM USING SAME

FIELD OF THE INVENTION

This invention relates to optical devices generating circular coordinate scan patterns. In a specific application, the invention relates to object recognition systems in which characteristic marker arrays are optically scanned to produce a reflected pattern which is electronically processed to generate a signal corresponding to a given marker array.

BACKGROUND OF THE INVENTION

Automated object recognition systems have long been sought in order to expedite handling of objects, such as airline baggage and postal packages. Such automated systems have met with acceptance in those areas where the orientation and size of the objects is controlled such that tags placed on the objects always assume a desired orientation. For example, systems for automatically identifying railroad box cars use an array of parallel retroreflecting coded strips positioned within a predetermined zone on each car, which strips must be aligned parallel with the direction of travel. In the railroad box car identification systems, an *x–y* coordinate scan is formed in which the *x* scan is generated by the movement of the cars and the *y* scan is generated by an optical device contained within a sensor unit located proximate to the moving cars.

It has been long desired to provide a similar recognition system for objects which cannot conveniently be oriented with respect to a direction of travel.

U.S. Pat. No. 3,718,761 discloses an apparatus for rotating a planar scan comprising the combination of a light source providing a sheet beam, a rotating mirror drum, and an optical rotator such as a dove prism. This apparatus enables reading of graphic codes regardless of their orientation in a plane. The use of a sheet beam involves a complex optical apparatus, both as to the generation of the sheet beam as well as to the construction of the rotating mirror drum. The apparatus is limited in that the scan pattern is not suited for use with concentric ring patterns.

SUMMARY OF THE INVENTION

The present invention provides the capability of detecting coded information contained within any array of reflecting marker bands regardless of the orientation of the array within a plane. Accordingly, while an array of parallel marker strips may be preferred, other arrays such as bands of concentric circles or elipses, linear, but non-parallel strips, and other geometric configurations may also be detected.

These capabilities are provided by a unique circular coordinate scanning device which includes a line scanning means such as may be provided by a point light source and a rotating reflecting polyhedron for producing at least one planar scan. An angular scanning means comprising an inversion optical member such as an inversion prism, preferably a dove prism, is supported for rotation about an optical axis on which an incident light beam will emerge from the prism coincident with its original path. The prism is positioned so that a face intercepts at least one planar scan off-axis. In a specific embodiment, the prism is rotated about the optical axis so that each planar scan which is intercepted off-axis is transmitted and precessed by the prism. Upon impinging a plane normal to the axis, the transmitted scan defines an area bounded by two closed curves.

In a preferred embodiment, as illustrated in the drawing, a plane perpendicular to the rotational axis of the reflecting polyhedron forms a regular polygon.

In another preferred embodiment, also illustrated in the drawing, the reflecting polyhedron is provided with some reflecting faces which are parallel to the rotational axis to reflect the beam of light from a point source to provide a first planar scan and some other reflecting faces which are non-parallel to the rotational axis to provide a second planar scan. In this embodiment, the inversion prism may be positioned so that a face intercepts the first planar scan on the optical axis and intercepts the second scan off the optical axis. Rotation of the inversion prism about the optical axis precesses the second planar scan and transmits it so that the transmitted scan upon impinging on a plane normal to the optical axis defines an area bounded by two closed curves while the transmitted first planar scan defines an area bounded by one closed curve.

The reflecting faces of the polyhedron may be selected such that every face is positioned at a different angle with respect to the axis of rotation to provide a diverse pattern of transmitted scans.

Each of the aforementioned optical devices provides circular coordinate scanning patterns which are particularly useful in code recognition systems.

DESCRIPTION OF THE PREFERRED EMBODIMENTS

Figure 1:
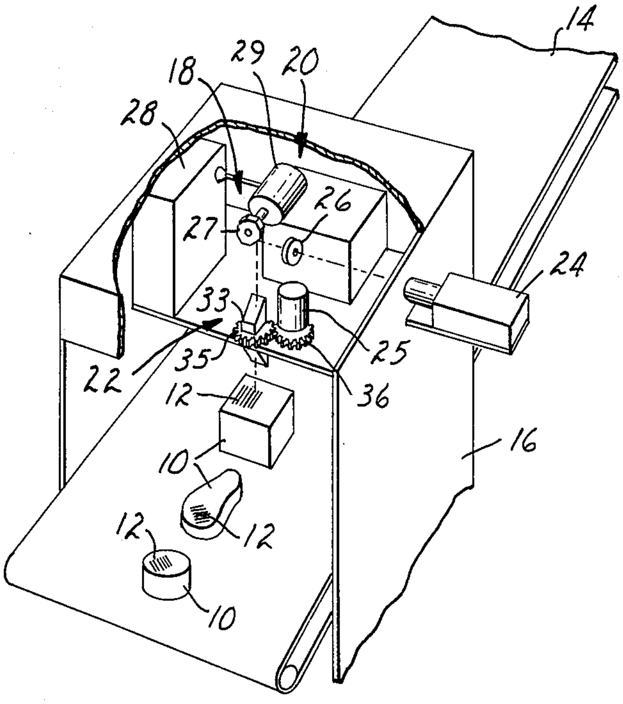
FIG. 1 is a partially broken away three-dimensional view of a code recognition system of the present invention.

A partially exploded three-dimensional view of a code recognition system according to the present invention is shown in FIG. 1. Objects 10 such as airline baggage (or postal packages) whose identities are to be established, are provided with a parallel array of retroreflecting marker strips 12 and are positioned on a conveyor belt 14 which carries the objects into an interrogation zone adjacent a detector unit 16. The detector unit 16 comprises an optical scanning device 18 having a line scanning member 20 and an angular scanning member 22 positioned to deflect a light beam across the interrogation zone in the manner hereinafter described. Light retroreflected from the marker strips 12 passes back through the angular scanning member 22 and through the line scanning member, whence it impinges on the photocell 26. Signals from the photocell are processed in the electronic signal processing unit 28 to recognize specific marker strips within the array.

Figure 2:
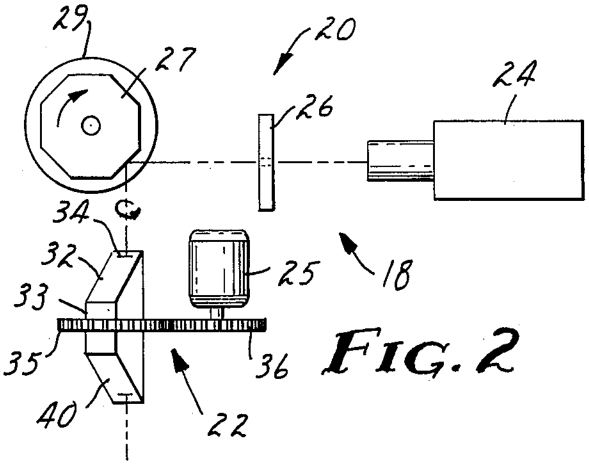
FIG. 2 is a schematic view of an optical device employed in the system of FIG. 1, showing the interaction of the line scanning member and angular scanning member utilized therein.

In FIG. 2, the line scanning member 20 is shown in detail to comprise a light source 24, a rotating reflecting polyhedron 27 which receives a focused or collimated light beam from light source 24 and a motor 29 for rotating the polyhedron 27. This rotation repetitively deflects the light beam into a planar scan such that a projection of the deflected beam onto a flat surface intercepting the planar scan forms a straight scanning line. The light source 24 is preferably a low power laser, but may also be a conventional light source, combined with appropriate focusing and/or collimating optics to produce a focused point source of light. The resultant light beam passes through an aperture provided in the photocell 26, and onto a reflecting surface of the polyhedron 27. The polyhedron 27 is preferably a multisided drum, a cross section of which taken perpendicular to its rotational axis forms a regular polygon. The rotating polyhedron 27 is coupled to a motor 29 which is preferably a DC servo motor to provide accurate control of the rotational velocity of the polyhedron 27. The polyhedron 27 is positioned with respect to the incident light beam from the light source 24 to intercept the beam below the rotational axis of the polyhedron 27 and perpendicular to its axis of rotation. Rotation of the polyhedron 27 by the motor 29 causes the light beam from the light source 24 to be deflected into the planar scan.

The angular scanning member 22, also shown in detail in FIG. 2, includes an inversion prism 33, preferably a "dove" prism, i.e., a truncated isosceles right triangular prism, mounted together with motor 25 to allow rotation of the prism about an optical axis. The prism 33 is mounted to receive the planar scan on a light input face 32 such that a projection 34 of the planar scan is off-set from the optical axis but with the plane of the scan parallel to the axis. The planar scans are then transmitted through the prism 33. The inversion prism 33 is mounted within a gear 35 which is coupled through a second gear 36 driven by motor 25, thereby providing rotation of the prism 33 about its optical axis. Rotation of the prism rotates the planar scan, resulting in a circular coordinate scanning pattern within the interrogation zone such that all of the marker strips within an array located within the zone are traversed by at least one sweep of the transmitted planar scan regardless of the orientation of the array.

The marker strips within each array 12 may be disposed in any of the known parallel strip code configurations. The strips may have different light reflecting, absorbing or scattering characteristics, however, it is preferred that retroreflecting strips be utilized. Accordingly, the photocell 26 is positioned in the path of the incoming light beam from light source 24 to receive the retroreflected light, and is provided with an aperture therein to allow the incoming light beam to pass through.

The drive units associated with the planar scan apparatus and the angular scan apparatus may be completely independent of each other. In another embodiment, however, the drive units may be interconnected to synchronize the line and angular scanning members. Thus, for example, the drive motors 25 and 29 shown in FIGS. 1 and 2 may be DC servo motors which are driven by a common drive circuit to ensure both synchronization and appropriate relative speeds of one with respect to the other. Alternatively, a single drive means may be provided with different coupling gear ratios associated with the line scanning member 20 and the angular scanning member 22. Since it is further desirable that the deflected beam traverse the marker arrays in substantially a straight line, even as the planar scan is being rotated by the angular scanning member 22, it is desirable that the planar scan have a repetition rate not less than 10 times the rotation rate of the angular scanning mechanism.

When a dove prism is provided as the inversion prism 33, light rays incident on one face 32 are inverted with respect to outward rays on a second face 40 such that rotation of the prism 33 about its optical axis causes the light rays to rotate around each other at twice the angular velocity of the prism. While a dove prism is preferred for use in the angular scanning member due to its simplicity of construction, other inversion prisms such as reversion prisms and Pechan prisms may similarly be used. Likewise, a series of plane mirrors may be substituted therefor.

Figure 3:
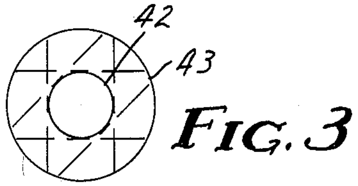
FIG. 3 shows a projection of a scanning pattern produced by the optical device of FIG. 2.

FIG. 3 shows a limited number of variously precessed off-axis planar scans projected onto a surface normal to the optical axis. As there shown, a circular coordinate scanning pattern is formed in which the off-axis placement of the planar scan with respect to the prism results in the precession of the transmitted planar scans about an inner closed curve 42, which is a circle so long as the incident planar scan is parallel to the optical axis. In this embodiment, the radius of the circle is defined by the distance the planar scan is off-set from the optical axis. In like manner, the outer closed curve 43 is a circle whose diameter is defined by the limits of the transmitted planar scan.

Figure 4:
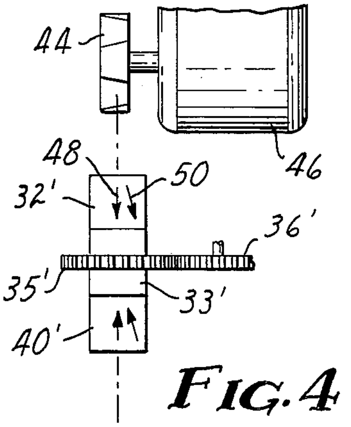
FIG. 4 is a schematic of another optical device of the present invention which produces a light beam in more than one planar scan.
Figure 5A:
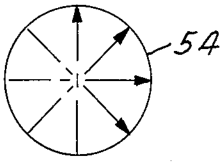
FIGS. 5A and 5B show projections of a scanning pattern produced by the optical device of FIG. 4.

A preferred embodiment for producing a more complex scanning pattern is shown in FIG. 4. In this embodiment, a rotating polyhedron 44 is driven by the motor 46 in the manner described hereinabove. The polyhedron 44, in addition to having reflecting faces parallel to the axis of rotation such as are provided on the reflecting polyhedron 27 shown in FIG. 2, also has additional reflecting faces the plane of which are non-parallel to the axis of rotation. The polyhedron 44 is positioned in the path of a light beam from a point light source such as source 24. Reflections of the light beam off the faces parallel to the axis of rotation produces a first planar scan, the plane of which is parallel to the optical axis of the inversion prism 33′. This first scan may intercept the axis, as shown by projection 48, on the face 32′ of the inversion prism 33′. Similarly, reflections off a reflecting face which is non-parallel with the axis of rotation produces a second planar scan non-parallel with the optical axis, as shown by projection 50. The prism 33′ and associated rotational elements 35′ and 36′ are the same as provided in FIG. 2. Upon rotation of the inversion prism 33′, the two planar scans are rotated to produce upon a plane normal to the optical axis of the prism 33′ a composite circular coordinate scanning pattern such as the combination of the patterns depicted in FIGS. 5A and 5B. The planar scan having a projection 48 produces that portion of the pattern shown in FIG. 5A limited by circle 54, the diameter of which is determined by the outer limits of the transmitted planar scan represented by the projection 48. Rotation of the prism causes the non-parallel planar scans represented by the projection 50 to be precessed about a point 58 corresponding to the optical axis such that the precessed scans *a–l* lie tangent to the closed curve 56.

If desired, every face of the reflecting faces may be positioned at a different angle with respect to the axis of rotation to provide more complex patterns and an expanded interrogation zone. Similarly, the inversion prism may be positioned such that none of the planar scans are on the optical axis.

Figure 5B:
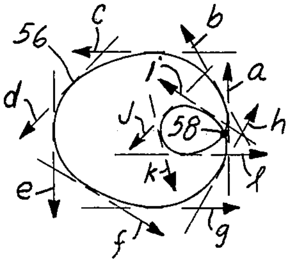

The embodiments of the present invention which produce off-axis radial scan patterns such as shown in FIGS. 3 and 5B enables objects provided with an array of parallel marker strips to be located over a wider area within the interrogation zone, in that even though marker arrays are positioned such that the strips extend radially outward from the axis of rotation, the precession of the planar scans about the axis of rotation ensures that such radially disposed strips will still be traversed by at least one planar scan.

Figure 6:
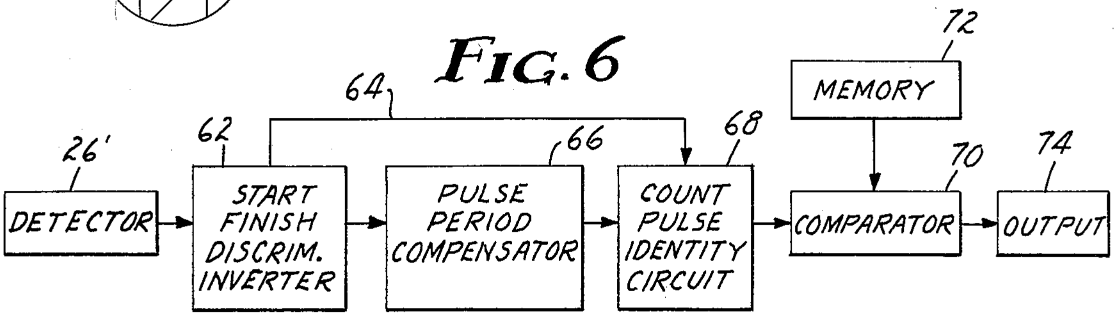
FIG. 6 is a block diagram of the light detector and signal processing equipment used in the embodiment of FIG. 1.

FIG. 6 is a block diagram of a preferred embodiment for processing the electronic signals to enable recognition of a particular code. The detector unit 26' is preferably a conventional photocell or photomultiplier having an aperture centrally disposed therein such that an incident light beam may pass through the aperture and wherein light reflected off the marker strip array is retroreflected back through the optical elements and thereon strike the light sensitive portions of the detector 26.

Signals from the detector 26 are coupled to a start-finish discriminator unit 62. Since the marker arrays may be randomly oriented within the interrogation zone, it is evident there will be some orientations at which the planar scans will traverse the marker arrays substantially parallel to the length of the marker strips, while at other times the planar scans will traverse the marker strips substantially perpendicular to their length. When a planar scan traverses substantially parallel to the length of the marker strips, not all of the marker strips within an array will be scanned. Thus, it is desirable to provide a marker array in which the outer strips provide a unique signal which enables a discriminator circuit to activate counting networks only when the complete marker array has been scanned. The start-finish discriminator unit 62 is thus sensitive to a distinguishable signal produced by outer strips within a marker array, and provides a gate signal on lead 64 only when signals from both a start and finish strip have been received.

The random positioning of marker arrays within the scanned area of the interrogation zone similarly results in the arrays being scanned either from start to finish, the direction being arbitrarily chosen, or alternatively being scanned in an inverted manner, i.e., from finish to start. In one embodiment, the marker arrays are provided to be symmetric with the start and finish strips providing identical electronic signals, and with the marker strips between the start and finish strips being symmetrically disposed, so that identical signals are produced regardless of the direction of sweep. Such an array is further desirable in that it provides redundant signals which may be further compared to improve reliability of the code recognition system. Where further information is desired within a given marker array, the start and finish strips may be chosen to provide separately distinguishable electronic signals. In such an embodiment, the marker strips between the start and finish strips may be disposed in a nonsymmetric manner. When such a code pattern is chosen, the start-finish discriminator unit 62 is further provided with another gate circuit which senses the time of occurrence of the start and finish pulses and which inverts the accompanying train of code pulses when a finish pulse is received prior to a start pulse.

The precession of the planar scans about the axis of rotation not only results in a randomly oriented marker array being scanned both parallel to and perpendicular to the length of the marker strips, but likewise results in the marker arrays being scanned at varying angles. Thus, even though the entire marker array is scanned, the scanning will take place at varying angles such that for a planar scan of uniform velocity, the length of time between the occurrence of a start and finish pulse will vary depending upon the angle of scan with respect to the length of the marker strips. In one embodiment, therefore, the marker strips are positioned at predetermined intervals between the start and finish strips such that the occurrence of the pulse at a predetermined time interval following the occurrence of a start pulse is uniquely associated with a given digit. In such an embodiment, it is desirable to normalize the length of time between start and finish strips to compensate for the varying angles of planar scan with respect to the length of the marker strips. Signals from the start-finish discriminator unit 62 are therefore coupled to a pulse period compensator unit 66 in which the relative time period between all start and finish pulses are normalized to a common duration.

Signals from the pulse period compensator 66 are thereafter coupled to a count pulse identity circuit 68, which circuit is activated in response to the gate pulses received on the lead 64. After being processed to ensure reliability of the code pulses such as by requiring the presence of at least two identical normalized pulse sequences, the signals are coupled to a comparator unit 70 within which the code pulse signals are compared with signals previously recorded in the memory unit 72 to identify the signals with a particular marker array. This information is then displayed on the output unit 74.

A variety of other signal processing techniques may similarly be used and are within the scope of the present invention. Such techniques are known to those skilled in information processing methods, and need no further recitation herein.

Having thus described the present invention, what is claimed is:

1. An optical scanning device comprising (i) line scanning means for producing a light beam in at least one planar scan and (ii) angular scanning means comprising an optical inversion member having an optical axis and at least one face intercepting said axis, said member being positioned so that said intercepting face intercepts at least one planar scan off said optical axis, and means for rotating the member about its optical axis to precess each off-axis intercepted planar scan which is transmitted by the member so that the transmitted scan upon impinging a plane normal to said axis defines an area bounded by two closed curves.

2. A device according to claim 1, wherein said inversion prism comprises a dove member.

3. A device according to claim 1, wherein said line scanning means comprises a light source providing an incident focused or collimated light beam.

4. A device according to claim 3, wherein the incident light beam is produced from a focused or collimated laser device.

5. A device according to claim 3, wherein said line scanning means further comprises a polyhedron having a plurality of reflecting faces disposed about an axis of rotation such that a plane perpendicular to the axis of rotation forms a regular polygon, which polyhedron is mounted to rotate about said axis such that when so rotated, said incident light beam successively intercepts said plurality of reflecting faces.

6. A device according to claim 5, wherein said polyhedron is provided with additional planar reflecting faces, the planes of which are non-parallel to the rotational axis of the polyhedron for producing a light beam in another planar scan, and wherein said face intercepts both planar scans.

7. A device according to claim 1, further comprising driving means for controlling the repetition rate of said planar scan and for controlling the rotation rate of said inversion member, wherein the repetition rate of said planar scan is not less than 10 times the rotation rate of said inversion member.

8. A code recognition system comprising:

a. an optical device including (i) line scanning means for producing a light beam in at least one planar scan and (ii) angular scanning means comprising an optical inversion member having an optical axis and at least one face intercepting said axis, said member being positioned so that said intercepting face intercepts at least one planar scan off-axis and means for rotating the member about its optical axis to precess each off-axis intercepted planar scan which is transmitted by the member so that the transmitted scan upon impinging a plane normal to said axis defines an area bounded by two closed curves;

b. means for successively receiving objects, each having located thereon an array of reflecting marker bands arranged to form a code, and positioning the objects such that at least one sweep of said transmitted planar scan traverses all of the bands within the array;

c. light detection means positioned to receive reflections of said transmitted planar scan from said marker array to generate electrical pulses in response to said reflections; and d. means for sensing the generation of electrical signals successively representing all bands of said array.

9. A system according to claim 8, wherein said array of reflecting marker bands comprises an array of parallel strips.

10. A system according to claim 8, wherein said reflecting marker bands are substantially retroreflecting, and said light detection means is positioned to receive said reflections after passing through said angular and line scanning means.

11. A system according to claim 8, wherein said array of reflecting marker bands comprises a first and a last band identifiable as start and finish indicating bands and additional bands spaced therebetween which form said code, and wherein said comparator means comprises means for sensing the dual presence of electrical pulses corresponding to said start and finish bands and for activating a comparison logic network in response to said dual presence.

12. A system according to claim 11, wherein said sensing means further comprises means for comparing signals associated with said additional bands produced as the result of more than one planar sweep and for activating an output to identify said specific coded marker bands only when said associated signals are the same.

13. A system according to claim 11, wherein said start and finish indicating bands are alike and said additional bands are symmetrically disposed therebetween.

14. A system according to claim 11, wherein said additional bands are uniformly spaced between said start and finish bands.

15. A system according to claim 11, wherein said comparator means further comprises means sensitive to said dual presence for establishing a time base period within which electrical pulses representative of said additional bands must appear, wherein the duration of the time base period varies depending upon the angle of a given planar scan with respect to said marker array and the presence of a specific code band is sensed in terms of a relative time of occurrence of a corresponding pulse during the base time period.

16. A system according to claim 11, wherein the start and finish bands are distinguishable from each other, further comprising means for inverting the base time period when a finish band is sensed before a start band is sensed.

* * * * *